United States Patent
Pershin et al.

(10) Patent No.: US 9,423,956 B2
(45) Date of Patent: Aug. 23, 2016

(54) EMULATING A STRETCHED STORAGE DEVICE USING A SHARED STORAGE DEVICE

(71) Applicant: VMware, Inc., Palo Alto, CA (US)

(72) Inventors: Aleksey Pershin, Fremont, CA (US); Sriram Krishnan, Shrewsbury, MA (US); Giridharan Sugabrahmam, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 175 days.

(21) Appl. No.: 14/265,027

(22) Filed: Apr. 29, 2014

(65) Prior Publication Data

US 2015/0309901 A1    Oct. 29, 2015

(51) Int. Cl.
| | | |
|---|---|---|
| G06F 11/00 | (2006.01) | |
| G06F 3/06 | (2006.01) | |
| G06F 11/20 | (2006.01) | |
| H04L 29/08 | (2006.01) | |

(52) U.S. Cl.
CPC ............... *G06F 3/06* (2013.01); *G06F 11/2028* (2013.01); *G06F 11/2038* (2013.01); *G06F 11/2048* (2013.01); *G06F 11/2094* (2013.01); *H04L 29/0854* (2013.01); *H04L 29/08549* (2013.01)

(58) Field of Classification Search
CPC ............ G06F 11/2094; G06F 11/2056; H04L 29/0854; H04L 29/08549
See application file for complete search history.

(56) References Cited

U.S. PATENT DOCUMENTS

| | | | | |
|---|---|---|---|---|
| 5,459,857 | A * | 10/1995 | Ludlam | G06F 11/2071 714/6.12 |
| 6,598,174 | B1 * | 7/2003 | Parks | G06F 11/008 711/162 |
| 2004/0267516 | A1 * | 12/2004 | Jibbe | G06F 11/261 703/24 |
| 2006/0217952 | A1 * | 9/2006 | Wu | G06F 11/1435 703/24 |
| 2007/0070535 | A1 * | 3/2007 | Fujitani | G06F 3/0607 360/46 |
| 2008/0115008 | A1 | 5/2008 | Daftardar | |
| 2009/0222596 | A1 * | 9/2009 | Flynn | G06F 3/061 710/22 |
| 2012/0150816 | A1 * | 6/2012 | Pafumi | G06F 11/1441 707/679 |
| 2015/0212913 | A1 | 7/2015 | Anumalasetty et al. | |
| 2015/0309890 | A1 * | 10/2015 | Pershin | H04L 67/1095 714/4.11 |

OTHER PUBLICATIONS

Non-Final Office Action, U.S. Appl. No. 14/265,055, dated Oct. 2, 2015, 10 pages.

\* cited by examiner

*Primary Examiner* — Yolanda L Wilson (57) ABSTRACT

Exemplary methods, apparatuses, and systems include receiving a device discovery command from a recovery manager running on a management server within a first or second datacenter. In response to the device discovery command, device identifiers for one or more logical storage devices within the first datacenter are requested. In response to the request, a device discovery response including a first identifier is received. The received device discovery response is modified to include the first device identifier as the identifier for both an underlying logical storage device and as an identifier for a peer logical storage device. The modified response is returned to the recovery manager in response to the device discovery command.

20 Claims, 5 Drawing Sheets

EMULATING A STRETCHED STORAGE DEVICE USING A SHARED STORAGE DEVICE

FIELD OF THE INVENTION

The various embodiments described herein relate to managing storage arrays in two different datacenter sites. In particular, embodiments relate to emulating a stretched storage device across datacenter sites.

BACKGROUND OF THE INVENTION

A primary consideration for the architecture of a virtual datacenter is how to best maximize the availability of the services provided by the virtual machines. Availability solutions are designed to improve the resiliency of local systems or entire sites and fall broadly into the categories of downtime avoidance and fault recovery. Fault recovery solutions include high availability and disaster recovery. High availability (HA) is an automated failover solution, typically within a single datacenter, that responds to unplanned outages and restarts virtual machines as appropriate. For example, if a virtual machine fails on one host computer, HA may respond by restarting the virtual machine on another host computer. Additionally, a virtual machine may be migrated from one host computer to another without first shutting down or suspending the virtual machine ("live migration"). Disaster recovery is a process for recovering all or a portion of a datacenter at a recovery site from replicated data. For example, a disaster recovery tool alerts an administrator of a possible site failure. The administrator may then provide input to the disaster recovery tool to initiate recovery of all or a portion of the inventory of virtual machines within the protected datacenter.

Recently, HA has been applied to clusters of devices that span datacenter sites. These "stretched clusters" offer the ability to balance workloads between two datacenters and enable migration of services between geographically close sites without sustaining an outage. A stretched cluster requires the same storage devices to be available within all locations of the cluster. As used herein, these storage devices are referred to as stretched storage devices. Stretched clusters add benefits to site-level availability and downtime avoidance, but introduce considerable complexity at the network and storage layers, as well as demanding rigorous operational management and change control. For example, disk writes are usually committed synchronously at both locations to ensure that data is consistent. Due to this complexity, the cost of stretched storage devices can be prohibitive. For example, vendors and customers may find it impractical to test features of stretched storage or develop software related to stretched storage due to the large expense of purchasing stretched storage devices.

SUMMARY OF THE INVENTION

Exemplary methods, apparatuses, and systems emulate stretched storage using shared storage devices across datacenter sites. An emulation layer receives a device discovery command from a recovery manager running on a management server within a first or second datacenter. In response to the device discovery command, the emulation layer requests device identifiers for one or more logical storage devices within the first datacenter. For example, the emulation sends a device discovery command to a storage adapter. In response to the request, the emulation layer receives a first device identifier for a first logical storage device. The emulation layer modifies the received response to include the first device identifier as the identifier for both an underlying logical storage device and as an identifier for a peer logical storage device. The modified response is returned to the recovery manager in response to the device discovery command.

In one embodiment, the request for device identifiers includes the emulation layer instructing a storage adapter to perform device discovery in both of the first and second datacenters. Using the device discovery responses, the emulation layer determines whether or not to create new entries within a site preference table for each logical storage device included in the device discovery responses. If the table contains a previous entry for a logical storage device, the emulation layer will use the entry to determine whether to report the logical storage device as a source or target to the recovery manager. If the table does not contain an entry for a logical storage device, the emulation adds a new entry to the table. The entry will contain an indication of whether the logical storage device was received from the local or remote array. Additionally, the entry will contain an indicator for the site preference for the logical storage device. If the logical storage device came from a local array, the new entry for the logical storage will have the site preference. If the logical storage device came from the remote array, it will not have the site preference. Logical storage devices that have the site preference (according to the site preference table) will be reported as source devices to the recovery manager with the same device ID as the device reported by the array. Additionally, the report of each source device will include a peer device identifier that is the same device identifier used for the source device. Logical storage devices that do not have the site preference (according to the site preference table) will be reported to the recovery manager as target devices with the device with the same device identifier used for the source device.

In one embodiment, the emulation layer receives a failover or restore replication command. In response, the emulation layer modifies the site preference. For example, if the failover command indicates that a logical storage device is being failed over from the first site to the second site, the emulation layer modifies the entry for this logical storage device in the site preference table at the first site to indicate that the logical storage device does not have the site preference. Similarly, the emulation layer modifies the entry in the site preference table at the second site to indicate that the logical storage device has the site preference.

In one embodiment, the first storage device is a source storage device and the second storage device is a target storage device. The data is replicated from the source storage device in a first datacenter to a target storage device in a second datacenter. The source and target storage devices storing the replicated data are in an active-passive configuration, such that the source storage device storing the production data is active and identified by the first device identifier, and the target storage device storing the replicated data is passive and identified by a second device identifier. In such an embodiment, the emulation layer processes the source devices as described above and disregards target devices.

Exemplary methods, apparatuses, and systems further include emulating synchronization of a stretched storage device and a test failover of an emulated stretched storage device. Similar to the embodiment described above, data is replicated from a source storage device in a first datacenter to a target storage device in a second datacenter according to an active-passive configuration. The source storage device storing the production data is active and identified by a first device identifier. The target storage device storing the replicated data is passive and identified by a second device identifier. In response to a synchronization, test failover start, or test failover stop command, the emulation layer requests device identifiers for one or more logical storage devices within the first datacenter. In response to the request, the emulation layer receives a first device identifier for a first logical storage device within the first datacenter and a peer device identifier for a second logical storage device within the second datacenter. The emulation layer uses the peer device identifier to send the command to a storage adapter.

For example, when the emulation layer receives a test failover start command from the recovery manager, the emulation layer examines the site preference table for the logical storage device specified in the command. The emulation layer uses the site preference table to determine whether to perform a local or a remote device discovery response to extract the device identifier of the peer device for the specified logical storage device. The emulation layer sends, via the storage adapter, a command using the extracted device identifier to the array including the peer device to create a snapshot of the peer device. The emulation layer receives a response from the storage adapter when the snapshot is created. The emulation layer modifies the response in such a way that the created snapshot is presented to the recovery manager as a snapshot of the emulated stretched device.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein emulate stretched storage between the first and second datacenters. An actual stretched storage device includes two storage devices, one in each of two datacenters. The two storage devices contain the same data and are presented to a datacenter manager as the same device by using the same device identifier for both devices. The emulation of stretched storage described herein includes utilizing the device identifier of a first storage device in the first datacenter as a representation of a peer storage device in the second datacenter despite the first storage device not being a stretched storage device. Datacenter manager commands directed to the emulated stretched storage device in the second datacenter, however, are executed such that the first storage device is utilized over a network. If the first storage device is replicated to the second storage device, a snapshot of the replica may be created to emulate a snapshot of the emulated stretched device. The snapshot may also be accessed from the first datacenter over the network. As a result, the functionality of stretched storage can be tested and otherwise utilized without incurring the full cost of actual stretched storage devices, e.g., to develop compatible software or to evaluate the benefits of implementing stretched storage.

Figure 1:
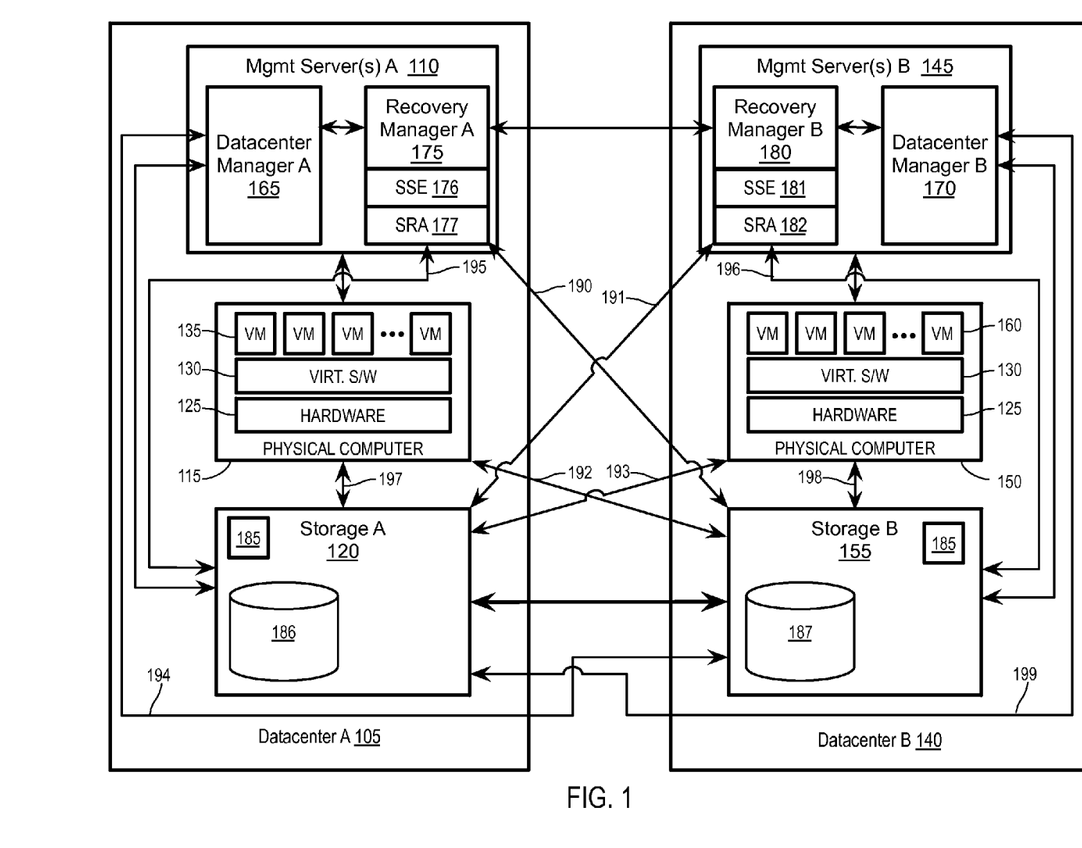
FIG. 1 illustrates, in block diagram form, exemplary virtual datacenters configured to emulate a stretched storage device.

FIG. 1 illustrates, in block diagram form, exemplary virtual datacenters configured to emulate a stretched storage device. Datacenter A 105 includes management server A 110, one or more host devices 115, and storage A 120. Each host device 115 includes hardware 125, virtualization software layer 130 (also referred to as a hypervisor), and VMs 135. Similarly, datacenter B 140 includes management server B 145, one or more host devices 150, and storage B 155. Each host device 150 includes hardware 125, virtualization software layer 130, and VMs 160. In one embodiment, datacenter A 105 represents a first datacenter site and datacenter B represents a second, geographically distinct datacenter site.

VMs 135/160 are complete computation environments, containing virtual equivalents of the hardware and system software components of a physical system and are typically implemented by an extensive virtualization infrastructure, which includes a variety of software and hardware components. For example, one or more of the VMs may implement virtual desktops. A virtual desktop is a virtual computing system that operates as a desktop or workstation computer with which an end user can interact using a desktop remoting protocol over a network. In one embodiment, one or more of the VMs implement a virtualized compute, networking, storage, or security service (e.g., a firewall, webserver, database server, etc.).

Virtualization software layer 130 runs on hardware 125 of host device (e.g., a physical computer) 115/150 and manages one or more VMs. Virtualization software layer 130 manages physical resources, e.g., hardware 125, as well as maintains virtual-to-physical hardware mappings. For example, virtualization software 130 may manage VM access to a processor, memory, or network interface within hardware 125 as well as a virtual disk for each VM within storage A 120 or storage B 155.

Each of storage A 120 and storage B 155 includes one or more physical storage devices. In one embodiment, storage A 120 and storage B 155 are storage arrays and include storage controllers 185 to serve read and write requests and management commands/queries from host devices 115/150 and management servers 110/145. Each of storage A 120 and storage B 155 is partitioned into logical units, volumes, virtual volumes, and/or disks (which are collectively referred to herein as logical storage devices) that are stored on one or more of the physical storage devices. Each logical storage device is identified by a device identifier, e.g., a logical unit number (LUN), volume identifier, etc. For example, storage A 120 is illustrated as including logical storage device 186 and storage B 155 is illustrated as including logical storage device 187. Each of storage A 120 and storage B 155 may include additional arrays, logical storage devices, or other partitions of storage.

In one embodiment, each of storage A 120 and storage B 155, or a portion thereof, is visible to both datacenters 105/140 (e.g., to management servers 110/145 and hosts 115/150). For example, a network administrator establishes network connections 190-199 to enable communication between SRA 177 and storage A 120 and storage B 155, between SRA 182 and storage A 120 and storage B 155, between host devices 115 and storage A 120 and storage B 155, and between host devices 150 and storage A 120 and storage B 155.

Additionally, a network administrator configures an array or a subdivision of storage A 120 for active-passive replication of, e.g., logical storage device 186, to an array or a subdivision of storage B 155, e.g., logical storage device 187. As used herein, active-passive replication provides a redundant copy of each storage device within the recovery datacenter, which is only brought online when the associated primary storage device within the protected datacenter fails. For example, the active instance, storage device 186, is available for read and write commands from VMs 135 in host device(s) 115 or VMs 160 in host device(s) 150. The passive instance, storage device 187, is a copy of storage device 186 and not available for read and write commands from any VMs 135/160 in order to prevent corruption of the replicated/back up data. When a snapshot of the replica device 187 is created as described herein, however, the snapshot is available for read and write commands from VMs 135 in host device(s) 115 or VMs 160 in host device(s) 150. In a typical active-passive configuration, the active storage device 186 is available only to VMs 135 in host(s) 115 and a snapshot of the passive storage device 187 is available only to VMs 160 in host(s) 150. The cross-site visibility of the storage devices described above, however, enables the emulation of stretched storage devices. In contrast, an actual implementation of stretched storage is considered to be an active-active configuration and both copies of the data are available for read and write commands from VMs 135/160 in the respective datacenter or in both datacenters.

Management server A 110 includes datacenter manager A 165. In one embodiment, datacenter manager A 165 provides a management console for manual and automated control of hosts 115, VMs 135, and storage A 120. Similarly, datacenter manager B 170 provides a management console for manual and automated control of hosts 150, VMs 160, and storage B 155. For example, datacenter manager A 165 and datacenter manager B 170 provision, configure, and maintain VMs as virtual desktops or network services; manage pools of computer resources to run the VMs. The recovery managers 175/180 provide administrative access to define protection groups, recovery plans, a preferred recovery type, and other failover policies.

Management servers 110/145 further include recovery managers 175/180. In one embodiment, datacenter managers 165/170 are implemented within different management servers 110/145 than recovery managers 175/180. Recovery managers 175/180 provide the implementation for unplanned failover, test failover, planned failover, and other data availability/recovery workflows. In one embodiment, recovery managers 175/180 each monitor their respective host devices 115/150 for indications of an error with or failure of a storage device. In one embodiment, one or more recovery managers 175/180 are implemented by a corresponding datacenter manager 165/170.

Management server A 110 further includes stretched storage emulator (SSE) 176 and storage replication adapter (SRA) 177. Similarly, management server B 145 further includes SSE 181 and SRA 182. Each SRA 177/182 enables a corresponding recovery manager 175/180 to send and receive vender-specific commands/messages to and from storage 120/155. For example, in order to provide uniform orchestration for device discovery, failover, synchronization, and test failover workflows across disparate storage arrays in the market, an SRA specification defines commands issued by recovery manager 175/180 during the various workflows and the expected behavior of the storage arrays for these commands. A corresponding SRA 177/182 is developed by or on behalf of each storage vendor in accordance with the SRA specification and translates the recovery manager commands into vendor-specific commands.

Each SSE 176/181 conforms to the SRA specification and works as an intermediate layer between SRA 177/182 and recovery manager 175/180 to emulate stretched storage between datacenters 105/140. When the recovery manager 175/180 sends an SRA command to the SSE 176/181, the SSE 176/181 either responds to the command directly without notifying the SRA 177/182, or sends one or more SRA commands to the SRA 177/182, analyzes the responses, and responds to the recovery manager 175/180 in such a way that a non-stretched storage device is presented as a stretched storage device to the recovery manager 175/180. As described further with reference to FIGS. 3-4, the emulation of stretched storage includes utilizing the device identifier of first storage device 186 in the datacenter A 105 as a representation of a peer storage device in the datacenter B 140 and otherwise filtering data from/appending data to messages between SRA 177/182 and recovery manager 175/180. The emulation of stretched storage allows for recovery manager(s) 175/180 to orchestrate zero-downtime planned failover, unplanned failover, and test failover of VMs 135/160 between datacenters 105/140.

In one embodiment, one or both of SSE 176/181 and SRA 177/182 is implemented by or otherwise a part of recovery managers 175/180. Similarly, recovery managers 175/180 may be implemented or otherwise a part of datacenter managers 165/170. While SSE 176/181 is illustrated as an intermediate layer between SRA 177/182 and recovery manager 175/180, in an alternate embodiment, stretched storage emulation is implemented within storage 120/155. For example, storage controller 185 may implement or include the functionality of SSE 176/181 and interact directly with an SRA representing an actual stretched storage device. Additionally, storage controller may implement or include the functionality of SRA 177/182. In yet another embodiment, SRA 177/182 is omitted and commands are passed directly to storage 120/155. For ease of explanation, embodiments described herein include SRA 177/182. References to passing commands to underlying storage and/or SRA 177/182, however, are used interchangeably and include embodiments that omit SRA 177/182 as an intermediate layer as illustrated in FIGS. 1-2.

Components of datacenter A 105 are coupled to components of datacenter B 140. While various components are illustrated as being directly coupled for the ease of explanation (e.g., to illustrate the direction of replicated data), a network including one or more switches or routers may lie between datacenter A 105 and datacenter B 140 and facilitate the coupling of the various components.

Figure 2:
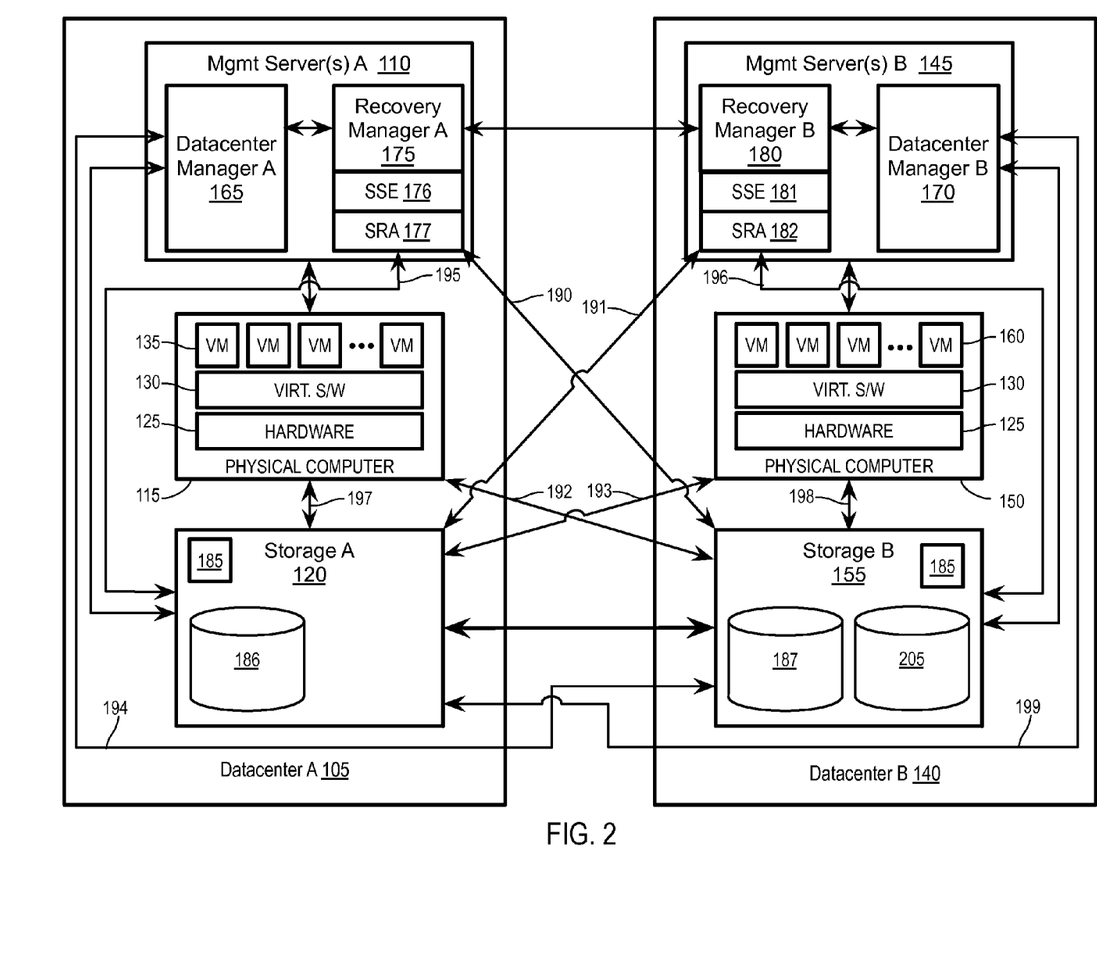
FIG. 2 illustrates, in block diagram form, the exemplary virtual datacenters of FIG. 1 further including a snapshot of replicated data.

FIG. 2 illustrates, in block diagram form, the exemplary virtual datacenters of FIG. 1 further including a snapshot of replicated data. As used herein, a snapshot refers to a copy of data created at a particular point in time. For example, snapshot 205 is a snapshot copy of data stored in storage device 187, which was replicated from data stored in storage device 186. In one embodiment, as described further herein, snapshot 205 is created in response to a recovery manager 175/180 command to perform a test failover.

Figure 3:
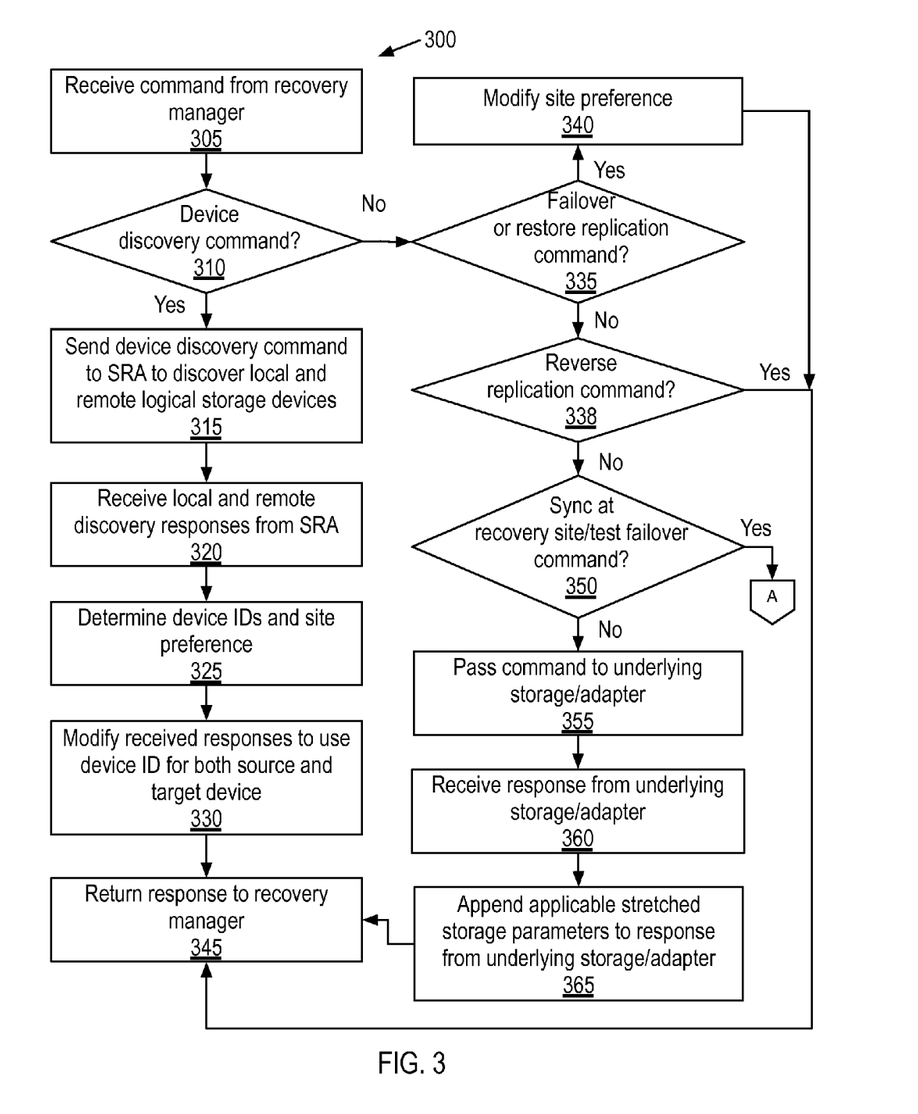
FIG. 3 is a flow chart illustrating an exemplary method of processing a command for an emulated stretched storage device.

FIG. 3 is a flow chart illustrating exemplary method 300 of processing a recovery manager command to emulate a stretched storage device. In one embodiment, as described above, a network administrator configures cross-site visibility 190-194 and 199 and active-passive replication between two datacenters. For example, storage A 120 is configured to replicate protected logical storage device 186 to datacenter B 140. Storage B 155 is configured to receive and store the replicated data as recovery logical storage device 187. Protected logical storage device 186 is active, e.g., configured to be available for read and write commands from VMs 135/160. Recovery logical storage device 187 is passive, e.g., configured not to be available for read and write commands from VMs 135/160, to prevent corruption of the back up data.

Figure 4:
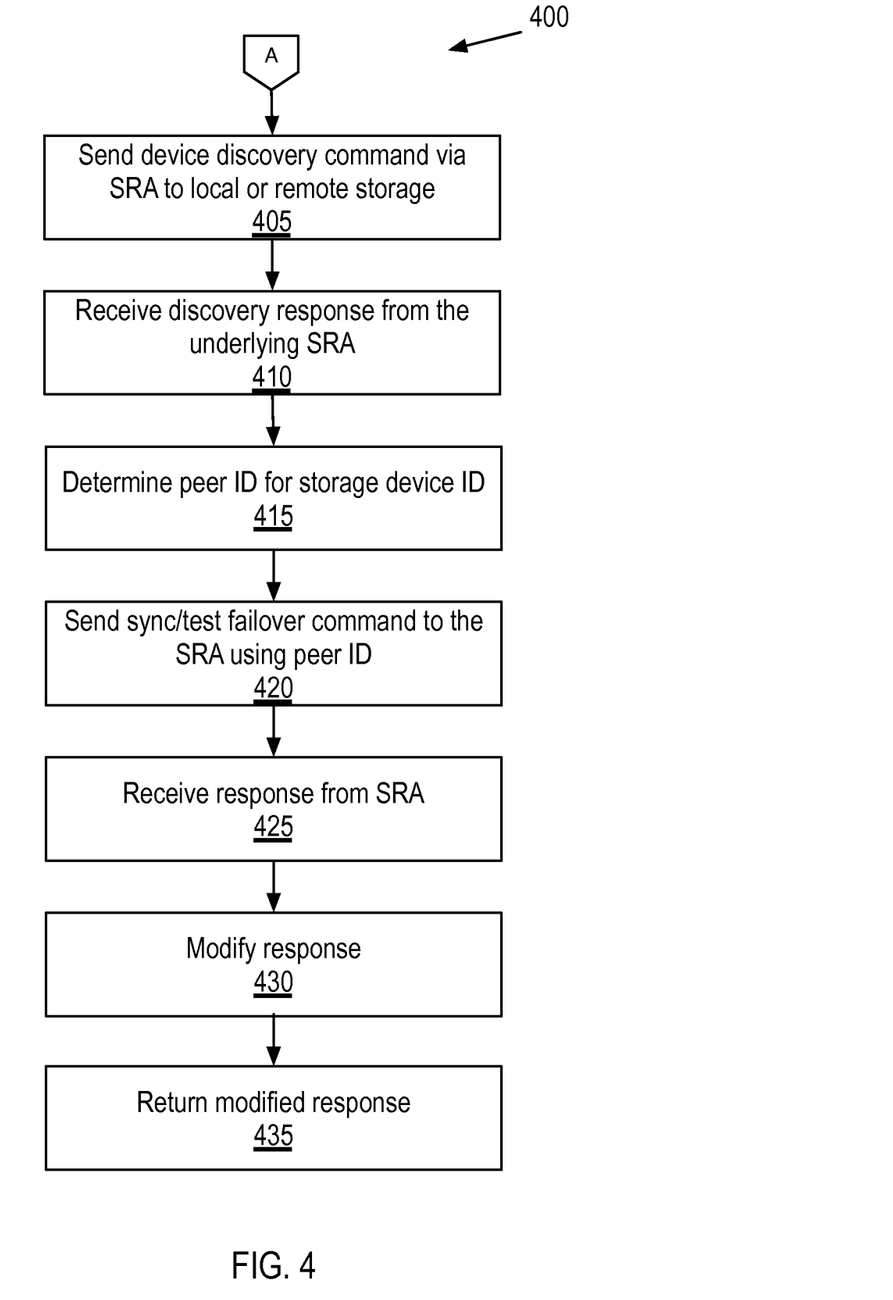
FIG. 4 is a flow chart illustrating an exemplary method of processing a synchronization or a test failover command for an emulated stretched storage device.

Similarly, the network administrator may configure storage B 155 as including one or more protected logical storage devices to be replicated to datacenter A 105 and to be actively available for read and write commands from VMs 135/160. Storage A 120 would, in turn, would be configured such that recovery logical storage devices receive and store the replicated data from storage B 155 and to prevent any read or write attempts by VMs 135/160. As a result, datacenters A 105 and B 140 may be configured for bidirectional replication of data and each provide for recovery of the other. For the ease of explanation, however, methods 300 and 400 will be described with reference to protection of data from datacenter A 105 to datacenter B 140 and the corresponding emulation of stretched storage. The replication of data from datacenter B 140 to datacenter A 105 and corresponding emulation of stretched storage may be similarly performed.

At block 305, SSE 176 receives a command from recovery manager 175 or SSE 181 receives a command from recovery manager 180. Exemplary commands include a query for emulator or adaptor information (e.g., version, identifier, etc.), a query for supported commands, a query for error definitions, a query for string descriptions, a query for connection parameters, a device discovery command requesting identification of and relationships between storage arrays or devices, a command to prepare a protected storage device for failover, a command to failover to a recovery storage device, a command to start a failover test, a command to stop a failover test, a command to reverse the direction of replication, a command to prepare to restore or to restore replication, a command to synchronize logical storage devices implementing a stretched storage device and storing replicated data, and a query as to the status of synchronization between storage devices.

At block 310, SSE 176/181 determines if the received command is a device discovery command. If the received command is a device discovery command, at block 315, SSE 176/181 sends a device discovery command to the corresponding underlying SRA 177/182 to discover both local and remote logical storage devices. For example, a device discovery command from SSE 176 would cause SRA 177 to discover local logical storage devices within storage A 120 using connection 195 and to discover remote logical storage devices within storage B 155 using connection 190.

At block 320, SSE 176/181 receives the device discovery responses form the corresponding underlying SRA 177/182. For example, SRA 177 may provide SSE 176 with a response from local storage A 120 indicating a device identifier for logical storage device 186. Additionally, in an embodiment in which logical storage device 186 is replicated to logical storage device 187, the response from SRA 177 may further include an indication that logical storage device 186 is a source storage device and include a device identifier for logical storage device 187 as a peer/target storage device for logical storage device 186. SRA 177 may further provide SSE 176 with a response from remote storage B 155 indicating a device identifier for logical storage device 187.

At block 325, SSE 176/181 determines and/or stores the device identifiers, locality information, and site preference for each logical storage device included in the discovery response. In one embodiment, this data is stored in a table or another data structure, collectively referred to herein as a site preference table. For example, for each logical storage device, SSE 176 determines if an entry already exists within the site preference table. If there is an entry, SSE 176 moves to the next logical storage device in the discovery response. If there is no entry, SSE 176 creates an entry for each source storage device. As used herein, a source storage device refers to a logical storage device that is not a part of a source/target replication pair or to a protected logical storage device that is replicated to a passive target storage device. In creating entries in the site preference table, SSE 176 disregards target storage devices. For example, SRA 177 provides SSE 176 with the response from remote storage B 155 with a device identifier for target storage device 187. SSE 176 does not create an entry in the site preference table for target storage device 187. Each entry includes the device identifier for underlying storage device, an indication of locality (if the logical storage device was discovered in local storage A 120 or remote storage B 155 when discovered by SRA 177), and an indication of site preference. In one embodiment, the initial entry sets site preference for local logical storage devices. For example, SSE 176 would create an initial entry for logical storage device 186 as a local device with site preference initially set because logical storage device 186 was discovered locally within storage A 120. In one embodiment, each SSE 176/181 maintains a separate site preference table. For example, SSE 181 would create an initial entry for an emulated remote target device using the same device identifier as logical storage device 186 and without site preference. Alternatively, the initial entry sets site preference for remote logical storage devices.

In one embodiment, site preference added to emulate stretched storage devices but not otherwise used in active-passive replication between datacenters. For example, when the network connection between datacenters 105/140 is lost, it may be unclear to recovery managers 175/180 whether or not the other datacenter 140/105 remains operational and if a local copy of data stored on actual stretched storage can be/continue to be actively modified via write commands. If both datacenters 105/140 remain active despite the loss of communication between them, each may treat the replicated data as active and create conflicting modifications to the data. Such a scenario is referred to as "split-brain" scenario. To avoid split-brain scenario, a site preference is configured to elect a datacenter or preferred logical storage devices to be active in the event of loss of connectivity to the other datacenter. Consequently, the other datacenter/set of storage devices is configured to become passive. To provide the corresponding stretched storage behavior, SSE 176/181 adds site preference to each of the source and target representations of the emulated stretched storage device.

At block 330, SSE 176/181 modifies the discovery response to emulate stretched storage. In one embodiment SSE 176/181 modifies the device discovery response(s) to replace the device identifier of peer/target storage device with the device identifier for the source storage device. For example, SSE 176 modifies a received response including a device identifier for source storage device 186 and a device identifier for peer storage device 187 to include the device identifier for source storage device 186 for both source and target/peer storage devices. In one embodiment, method 300 includes using emulated stretched storage independently of active-passive replication. For example, in response to a command received from recovery manager 175/180, SSE 176/181 creates a representation of stretched storage device within datacenter B 140 that corresponds to logical storage device 186 despite logical storage device 186 not otherwise having a source device/peer device relationship. In one embodiment, the modification includes duplicating a logical storage device identifier and labeling each with corresponding source and peer/target attributes, respectively. For example, an initial device discovery may result in SSE 176 determining that storage A 120 includes a storage device identified by a device identifier. SSE duplicates the device identifier to serve as both the underlying storage device in storage A 120 and as representation of a peer/target storage device (e.g., as would be expected in stretched storage to be discovered in storage B 155 of datacenter B 140).

In one embodiment, SSE 176/181 uses the site preference table for each logical storage device to determine whether to present the logical storage device as a source or target to the recovery manager 175/180. For example, if a logical storage device is set to have site preference in the site preference table, the logical storage device is presented as a source storage device. Alternatively, if the logical storage device is not set to have site preference in the site preference table, the logical storage device is presented as a target storage device.

At block 345, SSE 176/181 returns the modified response to the recovery manager 175/180. For example, if device discovery results in SSE 176 creating a site preference table entry including a device identifier for logical storage device 186 and an indication of site preference, SSE 176 responds to the command from recovery manager 175 with the device identifier for logical storage device 186 as a source device. Similarly, if device discovery results in SSE 181 creating a site preference table entry including a device identifier for logical storage device 186 and a lack of site preference, SSE 181 responds to the command from recovery manager 180 with the device identifier for logical storage device 186 as a target device. As a result, logical storage device 186 is presented to recovery managers 175/180 as being stretched across datacenters 105/140. All read or write commands directed to either source or target representation of the emulated stretched storage device, however, are sent to the single actual logical storage device 186.

If the command is not a device discovery command, at block 335, SSE 176/181 determines if the command is a failover or restore replication (i.e. undo failover) command. If the command is a failover or restore replication command, at block 340, SSE 176/181 modifies the site preference for logical storage devices subject to the command. For example, if the local site is the target site for the failover, SSE 176/181 modifies the entry in the site preference table for a given logical storage device to indicate that the local site has the site preference. If the local site is not the target site for the failover, SSE 176/181 modifies the entry in the site preference table for the given logical storage device to indicate that the remote site has the site preference. After a failover, SSE 176 will modify the site preference and, as a result, treat storage device 186 as a target device during the processing of the next device discovery command from the recovery manager. Whether treated as source or target logical storage device, however, the execution of these commands result in the continued use of storage device 186 within datacenter A 105 as it is the only actual logical storage device associated with the device identifier.

At block 345, SSE 176/181 returns the failover response to the recovery manager 175/180. For example, the failover may include sending a device discovery command to the local array (if the logical storage device is local) or the remote array (if the logical storage device is remote), receiving a device discovery response, and extracting the physical connectivity information for the device. For example, the physical connectivity information may include the IP address of the array and the corresponding mount path for the logical storage device. SSE 176/181 generates a failover response indicating that the logical storage device has been failed over along with the physical connectivity information extracted from the device discovery response.

If the received command is not a failover or a restore replication command, at block 338, SSE 176/181 determines if the command is a reverse replication command. If so, method 300 proceeds to block 345 and SSE 176/181 returns an indication of success to the recovery manager. For example, SSE 176/181 responds to the reverse replication command without passing the command to the underlying SRA 177/182 and without modifying the site preference table.

If the received command is not a device discovery, failover, reverse replication, or restore replication command, at block 350, SSE 176/181 determines if the command is a synchronization command called at the recovery site, test failover start command, or test failover stop command. If the command is a synchronization command called at the recovery site, test failover start command, or test failover stop command, method 300 continues via off page connector A to method 400 (described below with reference to FIG. 4). If the command is not a synchronization command called at the recovery site, test failover start command, or test failover stop command, at block 355, SSE 176/181 passes the command to the underlying storage (e.g., via SRA 177/182). Exemplary commands passed to SRA 177/182 include a query for commands supported by the SSE/SRA, a query for SSE/SRA error definitions, and a query for SSE/SRA string descriptions. At block 360, SSE 176/181 receives a response to the command from SRA 177/182. At block 365, SSE 176/181 modifies the response to append stretched storage parameters or remove parameters that are not applicable to stretched storage. For example, for a query capabilities command, the SSE passes the command to the underlying SRA. The SSE receives a response from the SRA and appends a "StretchedStorage" tag (or a similar indication) to corresponding features within the response. In one embodiment, the SSE removes capabilities that are not applicable to stretched storage and/or adds capabilities that are applicable to stretched storage. Similarly, the SSE would pass an error definitions query to the SRA. The SSE appends stretched storage definitions to the response and, if applicable, removes any error definitions not applicable to stretched storage. At block 345, the modified response is provided to recovery manager 175/180.

In one embodiment, SSE 176/181 responds to the command without passing the command to the underlying SRA 177/182 (not shown in FIG. 3). For example, similarly to the reverse replication command described above, the SSE returns a success response without modifying the site preference table or calling the underlying SRA. Similarly, if an underlying logical storage device is shared but not replicated, the SSE also returns a success response without modifying the site preference table or calling the underlying SRA in response to a synchronization command.

FIG. 4 is a flow chart illustrating exemplary method 400 of processing a synchronization (at the recovery site) or test failover start/stop commands for an emulated stretched storage device. As described above, SSE 176/181 receives a command from recovery manager 175/180 to synchronize, start, or stop a test failover for emulated stretched devices. The command includes an indication of the emulated stretched storage device, e.g., an identifier for emulated storage device, to be the subject of the synchronization or test failover command. A synchronization command is used to instruct an array to bring the latest copy of the production data from the protected site to the replica at the recovery site. The synchronization command includes an indication whether the command is being called on the protected or recovery site. While synchronization may be performed in either direction in actual stretched storage, the synchronization for active-passive replicated storage devices emulated to appear as stretched storage are synchronized only in the direction of the active-passive replication. A test failover, as used herein, is performed without stopping or otherwise interrupting the current use of the active system. For example, a test failover may be performed within a sandboxed or otherwise isolated computing environment to simulate the functionality of a failover without impacting the current operations that are reliant upon the protected data storage.

At block 405, SSE 176/181 sends a device discovery command to the underlying SRA to discover devices at either the local or the remote storage 120/155. For example, SSE 176/181 uses the site preference table to determine if a given logical storage device is a local or remote device. If the device is local, the device discovery command is sent to the local array. If the device is remote, the device discovery command is sent to the remote array. Method 400 is described with reference to synchronization at the recovery site. The synchronization command called on the protected site may be passed to the underlying SRA as the emulated stretched storage device identifier is the same as the actual logical storage device identifier on the protected site. If the replication synchronization command is called on the recovery site, the device identifier is translated by SSE 176/181. For example, for the synchronization of a logical storage device on the recovery site, SSE 176/181 performs device discovery to translate the emulated stretched storage device identifier to the actual recovery/passive device identifier. In an alternate embodiment, a mapping of the emulated stretched storage device identifier to the actual recovery/passive device identifier is stored in a data structure, such as the site preference table and SSE 176/181 does not send the device discovery command. Additionally, SSE 176/181 determines if the underlying SRA should discover devices at the local or remote storage 120/155 based upon the locality indication stored in the site preference table.

At block 410, SSE 176/181 receives the discovery response from the corresponding SRA. For example, SRA 177 may provide SSE 176 with a response from local storage A 120 indicating a device identifier for logical storage device 186. Additionally, the response from SRA 177 may further include an indication that logical storage device 186 is a source storage device and include a device identifier for logical storage device 187 as a peer/target storage device for logical storage device 186.

At block 415, SSE 176/181 extracts the peer/target storage device identifier from the discovery response. At block 420, SSE 176/181 sends the synchronization, test failover start, or test failover stop command to the corresponding underlying SRA with the extracted peer/target storage device identifier in place of the emulated stretched storage device identifier. In response to the command, the underlying SRA instructs the corresponding storage to synchronize data or to start or stop a failover test. For example, the SRA may instruct storage B 155 to start a test failover by creating snapshot 205 of logical storage device 187. Storage B 155 presents snapshot 205 to the hosts 115/150 and SRAs 177/182 in both datacenters 105/140.

At block 425, SSE 176/181 receives a response to the synchronization, test failover start, or test failover stop command from the underlying SRA. The received response includes the peer/target storage device identifier, e.g., as an indication of successful synchronization, as indication of performing a command to create a snapshot of the peer/target storage device, etc.

At block 430, SSE 176/181 modifies the response to the synchronization, test failover start, or test failover stop command to replace the peer/target storage device identifier with the emulated stretched storage device identifier. For example, the response from SRA 182 may present snapshot 205 to SSE 181 as being a snapshot of storage device 187. SSE 181 modifies that representation of snapshot 205 to replace the device identifier for storage device 187 with the device identifier for storage device 186. The modified response then presents snapshot 205 as a snapshot of the emulated stretched storage device as indicated by the device identifier for storage device 186. At block 435, SSE 176/181 returns the modified response to recovery manager 175/180.

Figure 5:
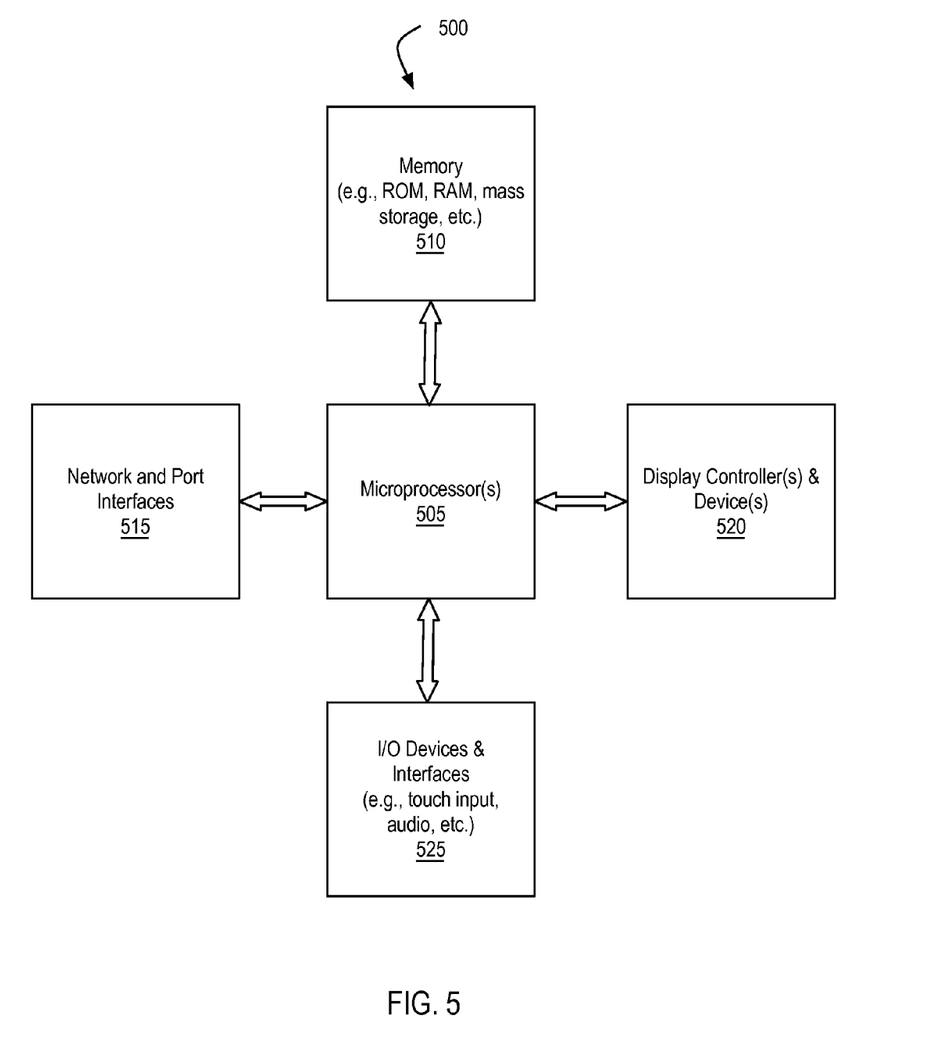
FIG. 5 illustrates, in block diagram form, an exemplary processing system to emulate a stretched storage device.

FIG. 5 illustrates, in block diagram form, exemplary processing system 500 to emulate stretched storage as described herein. Data processing system 500 includes one or more microprocessors 505 and connected system components (e.g., multiple connected chips). Alternatively, data processing system 500 is a system on a chip.

Data processing system 500 includes memory 510, which is coupled to microprocessor(s) 505. Memory 510 may be used for storing data, metadata, and programs for execution by the microprocessor(s) 505. Memory 510 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 510 may be internal or distributed memory.

Data processing system 500 includes network and port interfaces 515, such as a port, connector for a dock, or a connector for a USB interface, FireWire, Thunderbolt, Ethernet, Fibre Channel, etc. to connect the system 500 with another device, external component, or a network. Exemplary network and port interfaces 515 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 500 with another device, external component, or a network and receive stored instructions, data, tokens, etc.

Data processing system 500 also includes display controller and display device 520 and one or more input or output ("I/O") devices and interfaces 525. Display controller and display device 520 provides a visual user interface for the user. I/O devices 525 allow a user to provide input to, receive output from, and otherwise transfer data to and from the system. I/O devices 525 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 5.

Data processing system 500 is an exemplary representation of one or more of management server A 110, host device(s) 115, storage A 120, management server B 145, host device(s) 150, and storage B 155 described above. Data processing system 500 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 500 may be a network computer, server, or an embedded processing device within another device or consumer electronic product. As used herein, the terms computer, device, system, processing system, processing device, and "apparatus comprising a processing device" may be used interchangeably with data processing system 500 and include the above-listed exemplary embodiments.

It will be appreciated that additional components, not shown, may also be part of data processing system 500, and, in certain embodiments, fewer components than that shown in FIG. 5 may also be used in data processing system 500. It will be apparent from this description that aspects of the inventions may be embodied, at least in part, in software. That is, the computer-implemented methods 300 and 400 may be carried out in a computer system or other data processing system 500 in response to its processor or processing system 505 executing sequences of instructions contained in a memory, such as memory 510 or other non-transitory machine-readable storage medium. The software may further be transmitted or received over a network (not shown) via network interface device 515. In various embodiments, hardwired circuitry may be used in combination with the software instructions to implement the present embodiments. Thus, the techniques are not limited to any specific combination of hardware circuitry and software, or to any particular source for the instructions executed by data processing system 500.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. As used herein, the term "exemplary" refers to embodiments that serve as simply an example or illustration. The use of exemplary should not be construed as an indication of preferred examples. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
receiving a device discovery command from a recovery manager running on a management server within a first or second datacenter;
requesting, in response to the device discovery command, device identifiers for one or more logical storage devices within the first datacenter;
receiving, in response to the request, a device discovery response including a first device identifier for a first logical storage device within the first datacenter;
modifying the received device discovery response to include the first device identifier both as the identifier for the first logical storage device and as an identifier for a peer logical storage device to emulate the peer logical storage device as being actively available within the second datacenter; and
returning the modified response to the recovery manager in response to the device discovery command.

2. The computer-implemented method of claim 1, wherein data from the first logical storage device in a first datacenter is replicated to a target logical storage device in the second datacenter, wherein the first and target logical storage devices storing the replicated data are in an active-passive configuration, the first logical storage device storing the replicated data being active and identified by the first device identifier, and the portion of the target logical storage device storing the replicated data being passive and identified by a second device identifier,
wherein modifying the received response includes
receiving a device discovery response indicating that data is replicated from the first logical storage device identified by the first device identifier to the target logical storage device identified by the second device identifier, and
modifying the device discovery response to replace the second device identifier for the target logical storage device with the first device identifier for the first logical storage device.

3. The computer-implemented method of claim 1, further comprising:
storing the first device identifier and an indication of site preference associated with the first device identifier, the indication of site preference indicating which of the first and peer storage devices is a preferred storage device in an instance of lost communication between the first and second datacenters;

receiving a failover command to failover the first storage device from the first datacenter to the second datacenter; and modifying, in response to the failover command, the indication of site preference associated with the first device identifier to change the preferred storage device to another of the first and peer storage devices.

4. The computer-implemented method of claim 1, further comprising:

receiving a second command from the recovery manager;

returning, in response to the second command, an indication of success of performing the second command without performing the second command and without passing the second command to underlying storage.

5. The computer-implemented method of claim 1, further comprising:

receiving a second command from the recovery manager;

forwarding the second command to underlying storage;

receiving a response to the second command from the underlying storage;

modifying the received response to include parameters to emulate stretched storage; and providing the modified response to the recovery manager.

6. The computer-implemented method of claim 5, wherein forwarding the second command to the underlying storage includes passing the command to a storage adapter.

7. The computer-implemented method of claim 5, wherein modifying the received response includes appending error definitions or string descriptions to the received response.

8. A non-transitory computer-readable medium storing instructions, which when executed by a processing device, cause the processing device to perform a method comprising:

receiving a device discovery command from a recovery manager running on a management server within a first or second datacenter;

requesting, in response to the device discovery command, device identifiers for one or more logical storage devices within the first datacenter;

receiving, in response to the request, a device discovery response including a first device identifier for a first logical storage device within the first datacenter;

modifying the received device discovery response to include the first device identifier both as the identifier for the first logical storage device and as an identifier for a peer logical storage device to emulate the peer logical storage device as being actively available within the second datacenter; and returning the modified response to the recovery manager in response to the device discovery command.

9. The non-transitory computer-readable medium of claim 8, wherein data from the first logical storage device in a first datacenter is replicated to a target logical storage device in the second datacenter, wherein the first and target logical storage devices storing the replicated data are in an active-passive configuration, the first logical storage device storing the replicated data being active and identified by the first device identifier, and the portion of the target logical storage device storing the replicated data being passive and identified by a second device identifier, wherein modifying the received response includes receiving a device discovery response indicating that data is replicated from the first logical storage device identified by the first device identifier to the target logical storage device identified by the second device identifier, and modifying the device discovery response to replace the second device identifier for the target logical storage device with the first device identifier for the first logical storage device.

10. The non-transitory computer-readable medium of claim 8, further comprising:

storing the first device identifier and an indication of site preference associated with the first device identifier, the indication of site preference indicating which of the first and peer storage devices is a preferred storage device in an instance of lost communication between the first and second datacenters;

receiving a failover command to failover the first storage device from the first datacenter to the second datacenter; and modifying, in response to the failover command, the indication of site preference associated with the first device identifier to change the preferred storage device to another of the first and peer storage devices.

11. The non-transitory computer-readable medium of claim 10, further comprising:

receiving a second command from the recovery manager;

returning, in response to the second command, an indication of success of performing the second command without performing the second command and without passing the second command to underlying storage.

12. The non-transitory computer-readable medium of claim 8, further comprising:

receiving a second command from the recovery manager;

forwarding the second command to underlying storage;

receiving a response to the second command from the underlying storage;

modifying the received response to include parameters to emulate stretched storage; and providing the modified response to the recovery manager.

13. The non-transitory computer-readable medium of claim 12, wherein forwarding the second command to the underlying storage includes passing the command to a storage adapter.

14. The non-transitory computer-readable medium of claim 12, wherein modifying the received response includes appending error definitions or string descriptions to the received response.

15. An apparatus comprising:

a processing device; and a memory coupled to the processing device, the memory storing instructions which, when executed by the processing device, cause the apparatus to:

receive a device discovery command from a recovery manager running on a management server within a first or second datacenter;

request, in response to the device discovery command, device identifiers for one or more logical storage devices within the first datacenter;

receive, in response to the request, a device discovery response including a first device identifier for a first logical storage device within the first datacenter;

modify the received device discovery response to include the first device identifier both as the identifier for the first logical storage device and as an identifier for a peer logical storage device to emulate the peer logical storage device as being actively available within the second datacenter; and return the modified response to the recovery manager in response to the device discovery command.

16. The apparatus of claim 15, wherein data from the first logical storage device in a first datacenter is replicated to a target logical storage device in the second datacenter, wherein the first and target logical storage devices storing the replicated data are in an active-passive configuration, the first logical storage device storing the replicated data being active and identified by the first device identifier, and the portion of the target logical storage device storing the replicated data being passive and identified by a second device identifier, wherein modifying the received response includes receiving a device discovery response indicating that data is replicated from the first logical storage device identified by the first device identifier to the target logical storage device identified by the second device identifier, and modifying the device discovery response to replace the second device identifier for the target logical storage device with the first device identifier for the first logical storage device.

17. The apparatus of claim 15, wherein executing the instructions further cause the apparatus to:

store the first device identifier and an indication of site preference associated with the first device identifier, the indication of site preference indicating which of the first and peer storage devices is a preferred storage device in an instance of lost communication between the first and second datacenters;

receive a failover command to failover the first storage device from the first datacenter to the second datacenter; and modify, in response to the failover command, the indication of site preference associated with the first device identifier to change the preferred storage device to another of the first and peer storage devices.

18. The apparatus of claim 15, wherein executing the instructions further cause the apparatus to:

receive a second command from the recovery manager;

return, in response to the second command, an indication of success of performing the second command without performing the second command and without passing the second command to underlying storage.

19. The apparatus of claim 15, wherein executing the instructions further cause the apparatus to:

receive a second command from the recovery manager;

forward the second command to underlying storage;

receive a response to the second command from the underlying storage;

modify the received response to include parameters to emulate stretched storage; and provide the modified response to the recovery manager.

20. The apparatus of claim 19, wherein modifying the received response includes appending error definitions or string descriptions to the received response.

* * * * *